UNITED STATES PATENT OFFICE.

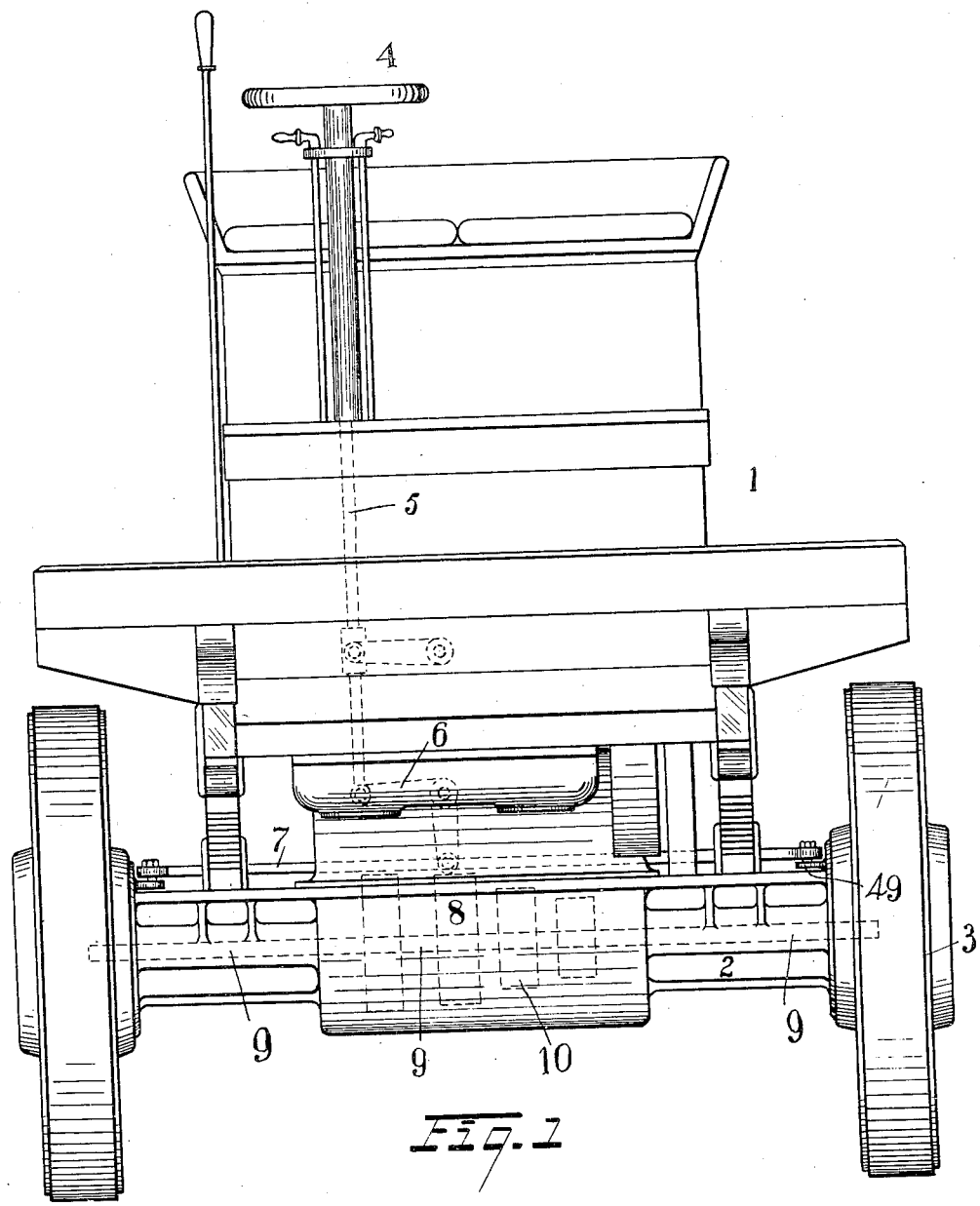

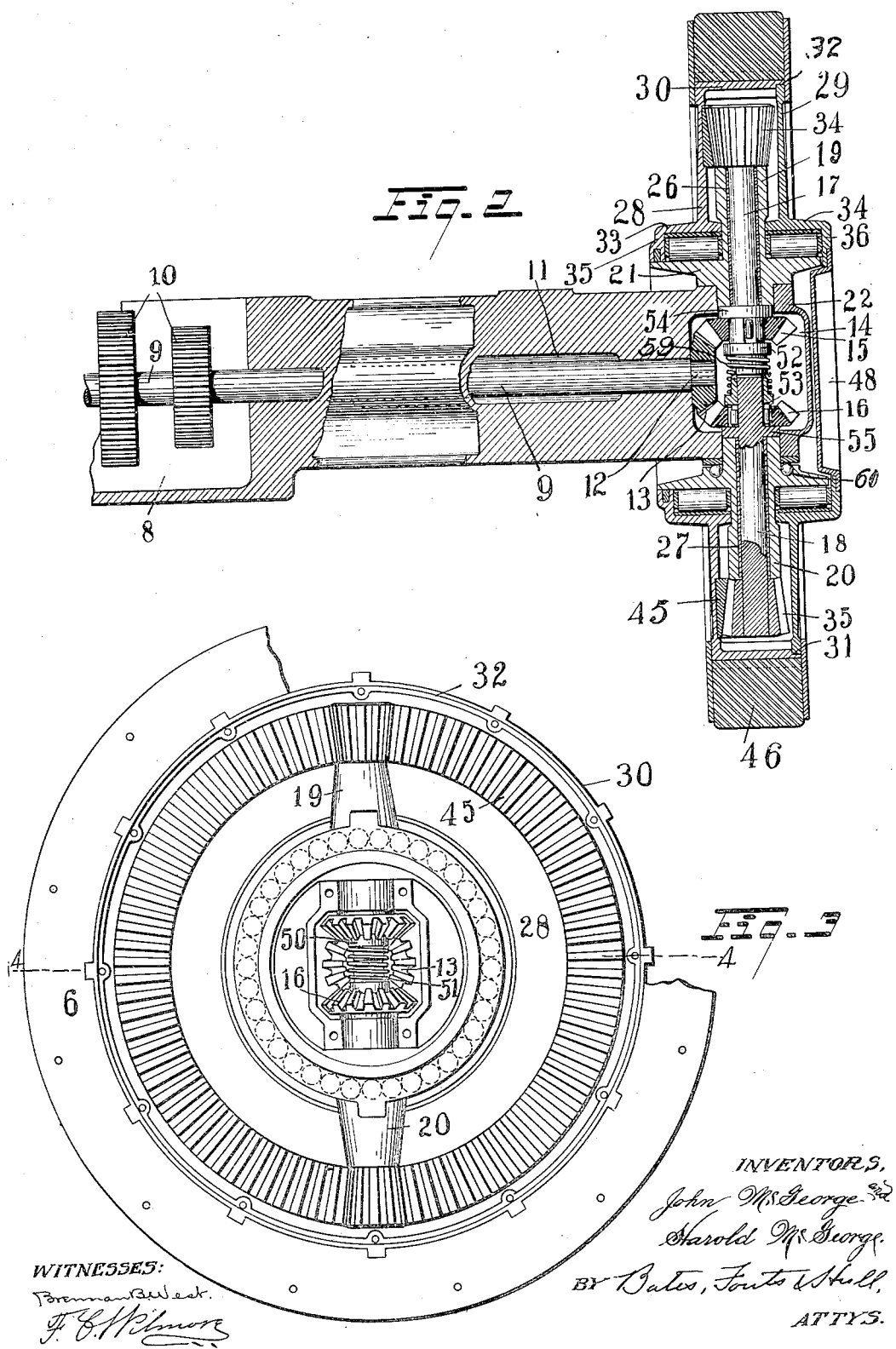

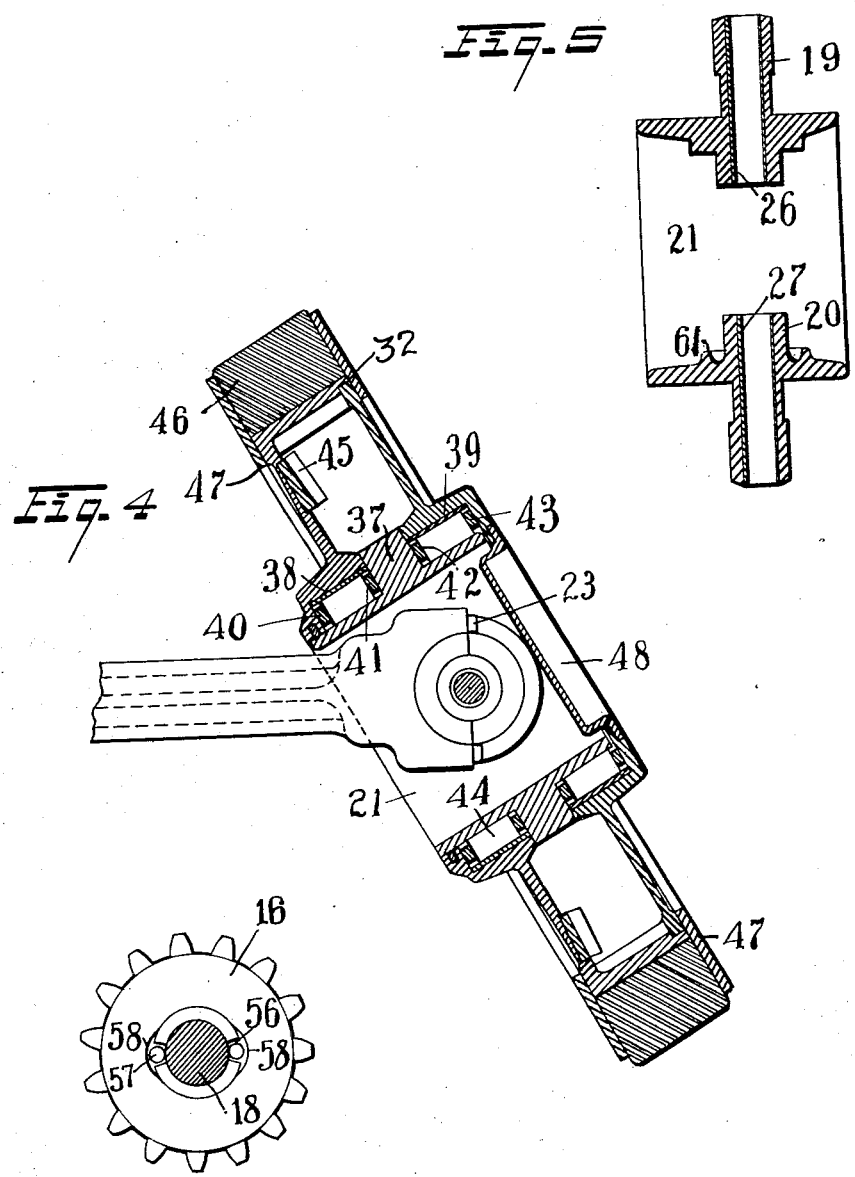

JOHN McGEORGE AND HAROLD McGEORGE, OF CLEVELAND, OHIO.

CENTER-DRIVE AXLE AND WHEEL.

No. 884,752.

Specification of Letters Patent.

Patented April 14, 1908.

Application filed March 5, 1907. Serial No. 360,703.

*To all whom it may concern:*

Be it known that we, JOHN MCGEORGE and HAROLD MCGEORGE, residing at Cleveland, in the county of Cuyahoga and State of Ohio, have invented a certain new and useful Improvement in Center-Drive Axles and Wheels, of which the following is a full, clear, and exact description, reference being had to the accompanying drawings.

Our invention relates to a combined center drive axle, wheel, and compensating mechanism, and has for its object to provide a novel construction whereby the driving strain from the shaft is equalized between opposite portions of the wheel; to provide an improved form of pivotal connection between the axle and the wheel; to provide a wheel wherein it is possible for the driving pinions for the wheel to mesh with opposite portions of a common rack and still permit of the turning of the wheel for the purpose of steering the vehicle; to provide an improved form of combined steering and bearing ring; to improve the construction of the means for transmitting power to the wheels; to locate the compensating mechanism at the central portion of the wheel; and, generally, to secure facility of assembling and disassembling as well as accessibility to the parts, ease of replacement, efficiency, solidity, and permanency of construction. We accomplish the above results by the construction embodied in the drawings wherein Figure 1 represents a front elevation of a truck having our invention applied thereto; Fig. 2 represents a vertical sectional view of a wheel and about half of an axle constructed in accordance with our invention; Fig. 3 represents an end elevation, with a part of the rim and the face plates removed for the purposes of inspection; Fig. 4 represents a sectional view of the wheel corresponding to the line 4—4 of Fig. 3 and showing the wheel tilted with respect to the axle; Fig. 5 represents a vertical sectional view through the combined bearing and driving ring; and Fig. 6 represents a detail of one of the clutches interposed between a pinion on one of the wheel shafts and the corresponding shaft.

Describing the parts by reference numerals, 1 represents a truck of any approved or standard construction having a front axle 2 and wheels 3 constructed in accordance with our invention.

4 denotes a steering wheel, the shaft 5 whereof is connected by means of a bell crank lever 6 with the steering rod 7, which in turn is pivotally connected with the wheels and preferably to the combined bearing and steering rings thereof.

8 denotes a gear box, which is preferably formed with the axle. We have shown our invention as adapted for a front-wheel drive, and it will be preferably employed in connection with front-wheels, although it will be understood that we do not limit ourselves to its use only with front wheels.

The axle may be of any desired commercial shape, the one shown herein being generally of the shape of an I-beam, which is cast with an enlarged central portion having a longitudinal recess extending therethrough for the reception of the various shaft sections. As previously stated, the central portion of the axle has formed therewith the gear box 8 for the reception of the ordinary speed-changing and reversing gears.

The shaft 9 has the central portion thereof provided with any suitable number of speed-changing gears 10 in gear box 8. In casting the axle, the portions of the longitudinal recess therein which are adjacent to the gear box and the outer ends of the axle are reduced to form bearings for the shaft, and the portions intermediate of such bearings are enlarged, as at 11, to reduce the friction between the shaft and the corresponding portions of the axle. The shaft 9 receives its motion directly from the gears mounted in the gear box, and its motion in turn is transmitted to each wheel by the construction now to be described, particular reference being made to Fig. 2. Each end of shaft 9 is reduced, as at 12, to receive a driving pinion 13 keyed thereon.

The outer end of the axle is cupped to provide part of a housing or box 14 for the reception of pinion 13 and the pinions 15 and 16 which coact therewith for the purpose of driving the wheel. Gears 15 and 16 are carried by the inner ends of shafts 17 and 18 respectively. These shafts extend outwardly through elongated bearings 19, 20 projecting inwardly and outwardly from the bearing and steering ring 21. The inwardly projecting portions of said bearings project through corresponding apertures provided in the outer end of the axle cup and the inner end of the cap 22, said cap being secured in place on the end of the axle by any suitable means, as by machine screws 23 (see Fig. 4) and completing the housing for the reception of the pinions 13, 15 and 16.

The ring 21 is preferably a casting, but may be forged or rolled, and the bearings 19, 20 thereof are extended outwardly as far as the bevel pinions 34, 35 respectively to provide an effective bearing for the shafts 17, 18. Each of said bearings is provided with a suitable bushing 26, 27 respectively.

The wheel proper comprises two annular inner and outer casing members 28 and 29, which may be of cast, forged, rolled or drawn metal, as preferred, the former member having an external flange 30 constituting the rim or felly. The outer member is generally of the same shape as the inner member and its outer periphery 31 is adapted to fit within an annular recess 32 on the flange 30 and to abut against said flange, as shown more particularly in Figs. 2 and 4. Each of the casing members 28 and 29 is provided at its inner periphery with a hub section having therein a partial race way, said partial race way being provided by flanges 33, 34 respectively, projecting generally at right angles from the web of each casing, and inwardly projecting flanges 35, 36 at the end of each of the former flanges, respectively. The race ways are completed by means of the outer surface of the ring 21 and the central flange or rib 37 projecting outwardly therefrom. A metallic lining or bushing 38, 39 is fitted within flanges 33, 34 respectively, and annular rings 40, 41, 42 and 43 of suitable metal are provided for the ends of the race ways. Within these race ways are provided suitable anti-friction devices, as the rollers 44.

At a short distance within the flange 30, the web of wheel casing 28 is provided with an annular rack 45 adapted to mesh with the bevel pinions 24 and 25, whereby the wheel is driven upon the ring 21 through the interposed rollers 44. Any suitable form of tread 46 may be provided for the wheel, the tread shown herein being of wood or similar material included between rings 47 bolted to wheel casings 28 and 29, the tread being held in place by means of bolts extending therethrough and through the rings.

The flange 36 of wheel section 29 is provided with a recessed seat adjacent to the inner edge thereof for the reception of the dust cap 48.

As will appear from Figs. 2, 3, and 4, the wheels constructed in accordance with our invention are driven from the centers thereof through shaft 9, and gears 13, 15, and 16. The axes of shafts 17 and 18 are coincident with a vertical diameter of the wheel extending midway between the inner and outer faces thereof. As a result and by reason of the compensating connections between gears 15 and 16 and their respective shafts, the wheel can pivot about said shafts to permit the steering of the vehicle. For the purpose of turning the wheels each ring 21 is provided with an eye 49 to which the end of the rod 7 is pivotally connected by means of a pin or bolt.

In order to drive the two wheels compensatingly and at the same time permit of the rotation of the wheels about the common axis of the shafts 17 and 18, I provide a roller clutch between each of the pinions 15 and 16 and its shaft. This clutch is conveniently constructed as follows: 50 and 51 denote sleeves which are respectively fitted to the inner ends of the shafts 17 and 18. The sleeves are provided with flanges 52, 53 respectively, between which and similar flanges 54, 55 on the shafts 17 and 18 respectively are fitted the bevel pinions 15 and 16. The sleeves 50 and 51 beyond the flanges thereof and within the pinions 15 and 16 are provided each with one or more recesses 56 therein within each of which is a roller 57. The recesses extend entirely through the sleeve body to permit the rollers to engage the outer surface of the shaft therewithin. The rollers are of somewhat greater diameter than the thickness of the sleeve and the inner face of the pinion is provided with a pair of recesses 58 for the reception of the outer surfaces of the rollers, said recesses having oppositely inclined surfaces. It will be apparent that, when the pinion is rotated in either direction with respect to rollers 57, the corresponding inclined faces of the pinion recesses will engage the outer portions of said rollers and will force the inner surfaces thereof into engagement with the outer surface of the shaft, whereby a driving connection is made between the pinion and the shaft. The sleeves (50 and 51) not only retain the rollers in proper relation to the shafts and pinions, but are also, in effect, friction rings through the action of the spring 59 which pushes the outer ends of the sleeves against the flanges 54 and 55 tending to make them move more slowly than the pinions and thus prevent the jamming of the rollers between the pinions and the shafts, especially at a time when the speed of either of the shafts is greater than the speed of its pinion, which will occur with respect to one of said shafts when the wheel is rotated for the purpose of steering the vehicle.

Among the advantages to be derived from our construction are the equalizing of the driving strain by the use of the two shafts 17 and 18, the gears whereof engage diametrically opposite portions of the wheel, near the periphery thereof. The provision of the two shafts also equalizes the side thrust on the pinion 13 and on the end of the shaft 9. The construction of the bearing and driving ring provides a long tubular bearing for each of the shafts 17 and 18 and effectively takes up and distributes the side thrust produced on said shafts. To facilitate the turning of the wheel about the shafts as an axis, the horizontal ball bearing 60 is provided between the lower surfaces of axle 2 and cap 22 and the corresponding upper surface of the ring 21. The ball race 61 is preferably provided around the inwardly extending tubular projection 20 of said ring.

It will be apparent that the wheel, while embodying a high degree of mechanical efficiency, is easily accessible for the purposes of inspection, repair, and for assembling and disassembling the parts. By merely removing the dust caps 22 and 48, the entire wheel, including the bearing and steering ring 21 and the compensating gears and shafts 17 and 18, may be slipped off the end of the axle. The wheel itself is easily assembled and disassembled, being composed mainly of the two sections 28 and 29, by the disassembling of which the parts are easily accessible for the purposes of inspection, removal, replacement or repair. When the wheel has been removed from the axle, the shaft 9 may be removed longitudinally through the housing formed by the end of the shaft. Furthermore, the compensating mechanism which we employ is not subject to a disadvantage which is inherent with the ordinary forms of compensating mechanism. Each of the wheels is driven independently of the other by means of its roller clutch compensating mechanism. Should it happen that one of the wheels of the vehicle strikes a slippery space, it will rotate at a speed no greater than that of the other wheel. The other wheel, being on firm ground, will drive the vehicle, and the progress of the latter will not be delayed materially so long as traction is afforded for one of the wheels.

From the construction heretofore described, it will be apparent that provision is made for two compensating actions. A compensating action is afforded between the two shafts 17 and 18 of each wheel when the wheel is cramped or turned for the purpose of steering and a compensating action is also afforded between the two wheels themselves, as when turning a corner, to permit the outer wheel to over-run the driving part. Furthermore, by driving from the inner wheel we largely overcome any tendency to skid and such tendency to skid is still further reduced when our invention is applied as a front wheel drive.

We claim:

1. In a driving mechanism for vehicles, the combination of a pair of wheels, a shaft for each wheel, a driving shaft, and clutch mechanism interposed between the driving shaft and each wheel shaft, substantially as specified.

2. In a driving mechanism for self-propelled vehicles, the combination of a pair of wheels, each having a shaft for driving the same, a driving shaft common to the wheel shafts and a roller clutch interposed between each of the latter shafts and the common driving shaft therefor, substantially as specified.

3. In a self-propelled vehicle, the combination of a wheel having a circular rack, a shaft having thereon a driving gear, a pair of shafts extending in opposite directions and having gears driven by the former gear, and a pinion on the outer end of each of the latter shafts meshing with said rack, substantially as specified.

4. In a self-propelled vehicle, the combination of an axle having a longitudinal recess, a shaft mounted in said recess and having its outer end provided with a driving gear, a pair of shafts extending in opposite directions and having gears driven by the former gear, a pinion on the outer end of each of the latter shafts, and a wheel having a circular rack meshing with the pinions on the outer ends of said shafts, substantially as specified.

5. In a self-propelled vehicle, the combination of an axle having a longitudinal recess constituting a bearing for a shaft, a shaft in said recess, a driving pinion on the end of said shaft, a wheel supported on said axle, shafts extending in diametrically opposite directions from said axle, each of said last-mentioned shafts having a gear on its inner end meshing with said driving pinion and each having its outer end provided with a gear, a circular rack carried by the wheel and meshing with the last-mentioned gears, and means for rotatably supporting said wheel on said axle, substantially as specified.

6. In a self-propelled vehicle, the combination of an axle having a cupped outer end and provided with a longitudinal recess constituting a bearing for a shaft, a shaft in said recess, a driving pinion on the end of said shaft within said cup, a wheel supported on the end of said axle, shafts extending in diametrically opposite directions from the cupped end of said axle and each having both ends thereof provided with gears, a circular rack carried by the wheel and meshing with the gears on the outer ends of the last-mentioned shafts, and means for rotatably supporting said wheel on said axle, substantially as specified.

7. In a self-propelled vehicle, the combination of an axle, a shaft supported in said axle and having a driving pinion, a combined bearing and steering ring secured to the end of the shaft, said ring being provided with bearings, a shaft journaled in each of said bearings and having its inner end provided with a gear meshing with the pinion on the end of the first-mentioned shaft, gears on the outer ends of the latter shafts, and a wheel rotatably mounted on said ring and driven by the gears on the outer ends of said latter shafts, substantially as specified.

8. In a self-propelled vehicle, the combination of an axle having a cupped end, a shaft supported in said axle and having a driving pinion within the cup on the end of the shaft, a combined bearing and steering ring secured to the end of the shaft, said ring being provided with an inwardly extending bearing projecting through the cupped end of said axle, a shaft journaled in said bearing and having its inner end provided with a gear meshing with the pinion on the end of the first mentioned shaft, a gear on the outer end of the second shaft, and a wheel rotatably mounted on said ring and driven by the gear on the outer end of said second shaft, substantially as specified.

9. In a self-propelled vehicle, the combination of an axle having its outer end provided with a cup, a shaft rotatably supported within said axle and having a gear within said cup, a cap closing the cupped end of said axle, a bearing ring, said ring having a radial bearing projecting through said cup and cap, a shaft mounted in said bearing and having a pinion at its inner end meshing with the first mentioned pinion and having a pinion at its outer end, and a wheel mounted on said ring and having a rack meshing with the latter pinion, substantially as specified.

10. In a self-propelled vehicle, the combination of an axle, a shaft rotatably supported within said axle and having a gear at its outer end, a bearing ring secured to the end portion of said axle, said ring having a pair of radially extending bearings, a shaft mounted in each of said bearings and having a pinion at its inner end meshing with the first mentioned pinion and having a pinion at its outer end, and a wheel mounted on said ring and having a rack meshing with the latter pinions, substantially as specified.

11. In a self-propelled vehicle, the combination of an axle having a cupped end, a shaft mounted in said axle and having a pinion within said end, a ring surrounding the cupped end of the shaft and having a pair of inwardly projecting radial bearings, a cap secured to the cupped end of the axle, said cap and axle end being provided with recesses for the aforesaid bearings, shafts projecting through said bearings and having their inner ends provided with pinions meshing with the pinion on the first-mentioned shaft, a wheel rotatably mounted on said ring, and means for rotating said wheel by the rotation of the latter shafts, substantially as specified.

12. In a self-propelled vehicle, the combination of an axle having a cupped end, a cap removably secured to said end and forming therewith a gear box, a shaft mounted in said axle and having its end provided with a pinion within said box, a ring surrounding said box and having a bearing projecting through a recess formed in the wall thereof, a shaft mounted in said bearing and having its inner end provided with a pinion meshing with the first-mentioned pinion, a wheel rotatably mounted on said ring, a gear on the outer end of the shaft which is mounted in said ring, and a rack on said wheel meshing with said gear, substantially as specified.

13. In a self-propelled vehicle, the combination of an axle having a cupped end, a cap removably secured to said end and forming therewith a gear box, a shaft mounted in said axle and having its end provided with a pinion within said box, a ring surrounding said box and having a pair of bearings projecting through recesses formed in the wall thereof, a shaft mounted in each of said bearings and having its inner end provided with a pinion meshing with the first mentioned pinion, a wheel rotatably mounted on said ring, a gear on the outer end of each of the shafts mounted in said ring, and a rack on said wheel meshing with said gears, substantially as specified.

14. In a self-propelled vehicle, the combination of a shaft provided with a gear, a pair of shafts extending generally at right angles with respect to the direction of the former shaft and each having a gear meshing with the first mentioned gear, a wheel, and means for rotating said wheel from the opposite ends of the latter shafts, substantially as specified.

15. In a self-propelled vehicle, the combination of a shaft provided with a gear, a pair of shafts extending generally at right angles with respect to the direction of the former shaft and each having a gear meshing with the first mentioned gear, a wheel, a circular rack carried thereby, and a gear on the outer end of each last mentioned shaft meshing with said rack, substantially as specified.

16. In a self-propelled vehicle, the combination of an axle, a shaft mounted therein and having a gear at its outer end, a wheel on said axle, a pair of shafts having their inner ends provided with gears meshing with the first mentioned gear and having their outer ends provided each with a gear for rotating the wheel, said last-mentioned shafts having their axes in substantially the same vertical plane, and means for turning said wheel about said shafts as a pivot, substantially as specified.

17. In a self-propelled vehicle, the combination of an axle having a shaft mounted therein, a gear on the end of said shaft, a bearing ring surrounding the end of said axle and said shaft, said ring being provided with a central rib or elevation extending around the same, a wheel surrounding said ring and forming with the outer surface thereof and said rib a pair of raceways, rollers in said raceways, and means for rotating said wheel on said rollers, substantially as specified.

18. The combination, with a vehicle axle, of a shaft mounted therein and having its outer end provided with a gear, a ring surrounding said axle and having formed therewith diametrically opposite bearings, each of said bearings projecting through the ring and outside of the same, a shaft mounted in each of said bearings and having its inner end provided with a gear meshing with the first mentioned gear and its outer end provided with a gear, and a wheel mounted on said ring and having a rack meshing with the gears on the outer ends of said shafts, substantially as specified.

19. The combination of a shaft having its outer end provided with a gear, a ring surrounding the outer end of said shaft and having formed therewith diametrically opposite bearings in substantially the same vertical plane, each of said bearings projecting through the ring and outside of the same, a shaft mounted in each of said bearings and having its inner end provided with a gear meshing with the first-mentioned gear and its outer end provided with a gear, a wheel mounted on said ring and having a rack meshing with the gears on the outer ends of said shafts, and means for turning said wheel about the axes of said vertical shafts as a pivot, substantially as specified.

20. The combination of an axle, a shaft mounted therein and having its outer end provided with a gear, a ring surrounding the end of said axle, a shaft extending through said ring and having its inner and outer ends provided with gears, a wheel mounted on said ring and having a rack meshing with the outer gear on the shaft, means for imparting a rotary movement to the ring, and a ball bearing interposed between the lower surface of the axle and the adjacent surface of the ring, substantially as specified.

21. The combination, with an axle, of a ring surrounding the end thereof, a wheel mounted on said ring, said ring being provided with a pair of oppositely arranged radial bearings, shaft sections journaled in said bearings, a driving shaft carried by the axle and having a gear for driving the shaft sections, gears on the outer ends of said shaft sections for rotating the wheel, and a ball bearing interposed between the lower surface of the axle and the adjacent surface of the ring, substantially as specified.

22. The combination, with an axle, of a ring surrounding the end thereof, a wheel mounted on said ring, said ring being provided with an inwardly extending radial projection, a shaft journaled in said projection, a driving shaft having a gear for driving the former shaft, a gear on the outer end of the former shaft for rotating the wheel, and a ball bearing interposed between the lower surface of the axle and the ring, the race-way for said bearing being provided in an annulus surrounding the inwardly-projecting shaft bearing, substantially as specified.

23. A combined steering and bearing ring for vehicle wheels, the same comprising a cylindrical body the outer surface whereof is provided with a circumferential rib located midway between the ends thereof, said ring having a shaft bearing, substantially as specified.

24. A combined steering and bearing ring for vehicle wheels comprising a cylindrical body having a shaft bearing formed therewith, said bearing having an inwardly projecting tubular portion and a ball race surrounding the said inwardly projecting portion, substantially as specified.

25. A combined steering and bearing ring for a vehicle wheel comprising a cylindrical body having a pair of oppositely arranged shaft bearings, each of said bearings having a tubular inner portion projecting within the ring and a tubular outer portion projecting beyond the surface thereof to provide elongated bearings, and a circumferential rib extending between the outer tubular projections, substantially as specified.

26. The combination of a driving shaft having a driving pinion thereon, a wheel having a circular rack, a pair of shafts each having its outer end provided with a gear engaging said rack, a pinion on the inner end of each of said shafts meshing with said driving pinion, and clutch mechanism interposed between each of the driven pinions and its shaft, substantially as specified.

27. The combination of a driving shaft having a driving pinion thereon, a wheel, a pair of shafts extending in diametrically opposite directions and each having its outer end provided with means for driving said wheel, and mechanism for compensatingly rotating said shafts from the pinion of the driving shaft, substantially as specified.

28. The combination of an axle, a driving shaft having its outer end provided with a driving pinion, a wheel mounted on said axle, a pair of oppositely extending shafts each having its outer end provided with a gear for rotating said wheel and its inner end provided with a pinion and compensating mechanism interposed between the driving and the driven shafts, substantially as specified.

29. The combination of an axle, a driving shaft having a driving pinion thereon adjacent to the end of the axle, a wheel mounted on said axle, a shaft having its outer end provided with a gear for rotating said wheel and its inner end provided with a pinion meshing with the driving pinion, and compensating mechanism interposed between the second shaft and its pinion, substantially as specified.

30. The combination of an axle, a driving shaft supported thereby and having opposite ends thereof provided each with a driving pinion, a wheel on each end of said axle, a shaft extending outwardly from the central portion of said wheel and having its outer end provided with a gear for rotating said wheel and its inner end provided with a pinion meshing with the pinion on the driving shaft, and compensating mechanism interposed between one of said pinions and its shaft, substantially as specified.

31. The combination of an axle, a driving shaft supported thereby and having its outer end provided with a pinion, a wheel mounted on said axle and having a circular rack, a shaft having its outer end provided with a gear meshing with said rack and its inner end provided with a pinion meshing with the former pinion, and compensating mechanism interposed between the latter pinion and its shaft, substantially as specified.

32. The combination of an axle, a shaft supported thereby and having its outer end provided with a driving pinion, a wheel mounted on said axle and having a circular rack, a pair of shafts extending in opposite directions from the center of the wheel and provided at their outer ends each with a gear meshing with said rack and at their inner ends each with a pinion meshing with the driving pinion, and a roller clutch interposed between each of the latter pinions and its shaft, substantially as specified.

33. The combination of a driving shaft having a driving pinion, a wheel rotatably mounted adjacent to said pinion and having a circular rack, a pair of oppositely extending shafts each having its outer end provided with a pinion meshing with the driving pinion, a sleeve surrounding the inner end of each of said latter shafts and extending within the pinion thereon, each of said sleeves having a recess extending therethrough, a roller in each recess adapted to engage the inner surface of its pinion, and a spring surrounding the inner ends of said sleeves and forcing the same outwardly, substantially as specified.

34. The combination of an axle, a driving shaft having a driving pinion thereon adjacent to the end of the axle, a wheel mounted on said axle, a shaft extending outwardly from said axle and having its outer end provided with a gear for rotating said wheel and its inner end provided with a gear meshing with the driving pinion, and compensating mechanism interposed between one of the gears on the latter shaft and said shaft, substantially as specified.

35. The combination of an axle, a driving shaft supported thereby and having the opposite ends thereof provided each with a driving pinion, a wheel on each end of said axle, a shaft extending outwardly from the central portion of each of said wheels and having its outer end provided with a gear for rotating said wheel and its inner end provided with a gear meshing with the pinion on the driving shaft, and compensating mechanism interposed between one of said gears and the latter shaft, substantially as specified.

36. The combination of a driving shaft having a driving pinion at each end thereof, a wheel adjacent to each of said pinions, a shaft extending outwardly from the central portion of each of said wheels and provided at its outer end with a gear for driving said wheel, and means for compensatingly rotating the latter shafts from the pinions of the driving shaft, substantially as specified.

37. The combination of a driving shaft having a driving pinion, a wheel adjacent to said pinion and provided with a circular rack outside of the hub thereof and a shaft extending through said hub and having a gear meshing with said rack, and also having a pinion on its inner end meshing with the driving pinion, substantially as specified.

38. The combination of a driving shaft having a pinion thereon, a wheel adjacent to said pinion and having a rack outside of the hub thereof, and a pair of shafts extending in opposite directions from the center of said wheel through said hub, each of said shafts having its outer end provided with a gear meshing with said rack, and its inner end provided with a pinion meshing with the driving pinion.

In testimony whereof, we hereunto affix our signatures in the presence of two witnesses.

JOHN McGEORGE.
HAROLD McGEORGE.

Witnesses:
J. B. HULL,
S. E. FOUTS.